July 2, 1940.                    H. BURAT ET AL                    2,206,715
                          TEMPERATURE RESPONSIVE APPARATUS
                                Filed Jan. 13, 1938
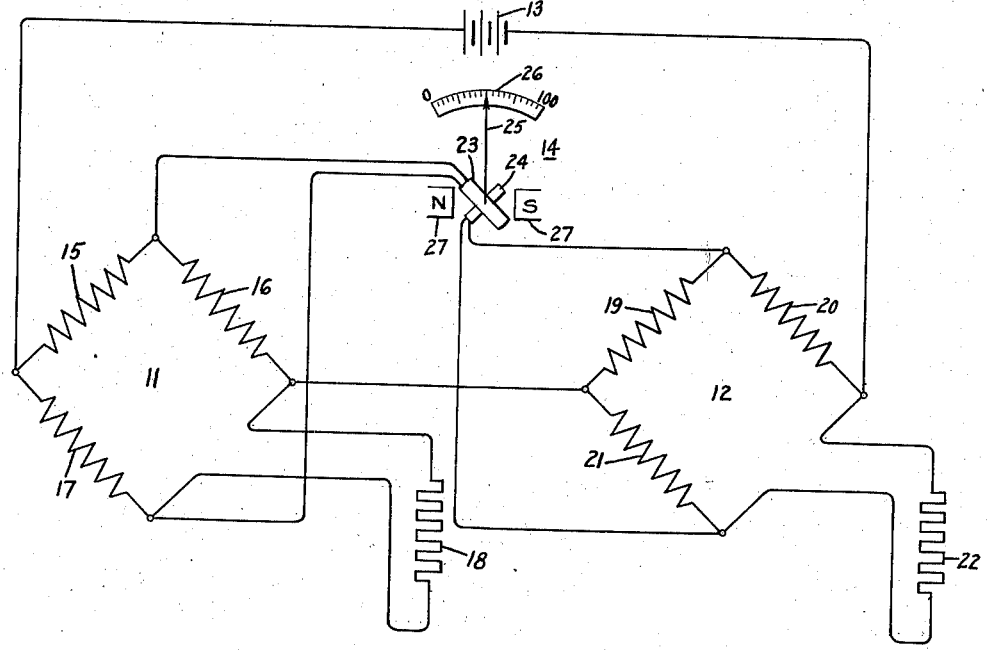
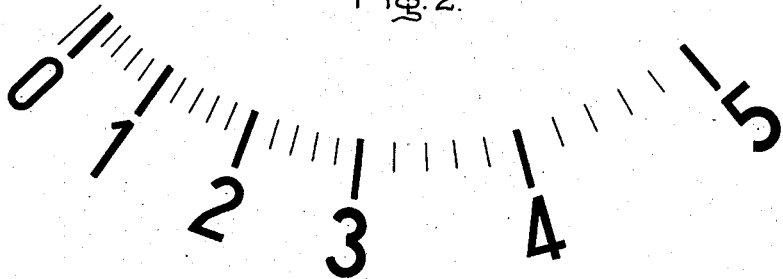
Inventors:
Herbert Burat,
Hermann R. Eggers,
by   Harry E. Dunham
   Their Attorney.

Patented July 2, 1940

2,206,715

UNITED STATES PATENT OFFICE 2,206,715

TEMPERATURE RESPONSIVE APPARATUS

Herbert Burat and Hermann R. Eggers, Berlin, Germany, assignors to General Electric Company, a corporation of New York Application January 13, 1938, Serial No. 184,876
In Germany January 22, 1937

1 Claim. (Cl. 73—362)

Our invention relates to temperature responsive devices and concerns particularly apparatus of the resistance type for measuring temperature.

It is an object of our invention to provide a temperature indicator having a scale expanded in the upper range thereof. Other and further objects and advantages of our invention will become apparent as the description proceeds. For the measurement of temperatures with resistances which vary with temperature, bridge circuits are used which can be made independent of changes in voltages of the current source by the use of ratio meters. In such arrangements the restraining coil of the ratio meter is ordinarily either in parallel with the bridge or in series with the temperature responsive resistor. In consequence a current flows through the coil which is in the same ratio as the bridge voltage in the one case and as the current in the temperature responsive resistor in the other case.

If an indicating apparatus, which gives a uniform scale for a small range of measurement is used for a large range, the scale tends to become more compressed toward the upper end, that is, as the temperature increases. This circumstance may be attributed to the fact that with increasing temperature the temperature coefficient of the material such as platinum, for example, used for the resistance thermometer of temperature responsive resistor becomes smaller. Furthermore, the relative change of resistance becomes smaller also because the temperature coefficient must be referred to a greater resistance with increasing temperature. In many cases it is not necessary to measure temperatures accurately in the lower ranges, but it is important on the other hand to maintain a high accuracy of deflection within a higher range. For example, if the temperature of a steam pipe is to be indicated between zero and 500° C., then the values between 400–500° C. are of primary importance while the values lying below that range are useful in general only when the steam pipe is being put into and out of operation. For such a purpose a scale would be desirable which is compressed in the lower range and expanded in the upper range.

In accordance with our invention, in its preferred form, such an indicating scale is obtained in a temperature measuring device containing a temperature responsive resistor in one of the arms of a bridge, by utilizing a crossed coil ratio instrument with a restraining coil arranged so that the ratio of the current flowing through the restraining coil to the current flowing in the temperature responsive resistor becomes smaller with increasing temperature. Correspondingly, a lower temperature produces a greater restraining force and a smaller sensitivity and a higher temperature produces a smaller restraining force and a higher sensitivity. By suitable selection of the relative values of the fixed resistances and the arrangement of the resistances, as wide a scale as desired is obtained.

The invention will be understood more readily from the following detailed description when considered in connection with the accompanying drawing and those features of the invention which are believed to be novel and patentable will be pointed out in the claim appended hereto. In the drawing Figure 1 is a schematic diagram showing the electrical circuits of one embodiment of our invention in which separate bridges are used for the restraining and deflection coils of the ratio instrument and a common current source is employed. Figure 2 is a sample of the scale which may be obtained by employing our invention.

The principle of operation of the invention may be grasped more easily by consideration of the embodiment of Fig. 1. In this arrangement there are two resistance bridges 11 and 12 of the Wheatstone type each having three resistance arms of constant resistance and one arm of temperature response resistance. There is a common current source 13 and a ratio instrument 14 of any suitable type having a pair of cooperating ratio coils one of which is connected in the diagonal of the bridge 11 and the other of which is connected in the diagonal of the bridge 12. The lateral arms of the bridge 11 consist of the fixed resistance resistors 15, 16 and 17 and a temperature responsive resistor 18; and the lateral arms of the bridge 12 consist of the fixed resistance resistors 19, 20 and 21 and a temperature responsive resistor 22. The temperature responsive resistors 18 and 22 are located at the point at which temperature is to be measured. The diagonal or cross arm of the bridge 11 includes the main or deflection producing coil 23 of the ratio instrument 14; and the cross or diagonal arm of the bridge 12 includes the other cooperating coil, i. e., the auxiliary or restraining coil 24 of the ratio instrument 14.

The ratio instrument 14 may be of any desired type, for the sake of illustration shown as crossed coil instrument having angularly displaced coils 23 and 24 mounted upon a pivoted shaft (not shown) carrying a pointer 25 cooperating with a scale 26. In this type of instrument there is a field structure represented by north and south poles 27 of a permanent magnet. Such ratio instruments operate upon the well-known principle in accordance with which one of the coils, referred to for convenience as a deflection producing coil, produces deflection of the movable element in one direction and thereby moves into a portion of the magnetic field reducing its torque; and the movement is opposed by a second coil, referred to for the sake of convenience as a restraining coil, which is deflected by the movement to a portion of the magnetic field where its own torque becomes greater so that an equilibrium is reached in which the torques are balanced; and the position at which this equilibrium is reached depends upon the relative magnitudes of the currents flowing in the two crossed coils.

In the arrangement shown in Figure 1 the auxiliary or restraining coil 24 is connected in the bridge 12 which is so arranged that for a low temperature a relatively greater current flows through the coil 24 which corresponds to a large restraining force and a small sensitivity, while for a higher temperature a smaller current flows through the restraining coil 24 which corresponds to a small restraining force and a greater sensitivity. Such an effect may be accomplished, for example, by selecting resistance values of the bridge arms of the bridge 12 which produce unbalance of the bridge at lower temperatures and which cause the bridge to approach balance with increasing temperature as the resistance of resistor 22 becomes greater. Of course, if negative temperature coefficient of resistance resistors were used, the resistance relationships of the fixed resistors would have to be reversed. As the bridge approaches balance, the current flowing through the diagonal arm containing the coil 24 decreases toward zero and the desired current relationship is obtained. In a similar manner in the arrangement of Figure 1, the bridge 11 may have the resistances of its arms so selected that the bridge approaches balance with decreasing temperatures, but is more and more unbalanced with rising temperatures so that greater current flows through the deflection producing coil 23 to produce deflections representing the magnitude of the temperature to be measured.

We have herein shown and particularly described a preferred embodiment of our invention and certain methods of operation embraced therein for the purpose of explaining its principle and showing its application but it will be obvious to those skilled in the art that many modifications and variations are possible and we aim, therefore, to cover all such modifications and variations as fall within the scope of our invention which is defined in the appended claim.

What we claim as new and desire to obtain by Letters Patent of the United States is:

A temperature responsive device comprising a pair of resistance bridges each having lateral arms and a diagonal arm, a common source of current energizing said bridges and a ratio responsive instrument having a deflection producing coil and a restraining coil, one of the arms of each of said bridges consisting of a temperature responsive resistor, said resistors being placed at a point at which temperature is to be measured, one of said ratio coils being connected in the diagonal arm of one bridge, and the other ratio coil being connected in the diagonal arm of the other bridge, the bridge containing the deflection producing coil being arranged to approach balance with decreasing temperature and the bridge containing the restraining coil being arranged to approach balance with increasing temperature.

HERBERT BURAT.
HERMANN R. EGGERS.